(12) United States Patent
Sheu

(10) Patent No.: US 6,330,385 B1
(45) Date of Patent: Dec. 11, 2001

(54) CABLES WITH WATER-BLOCKING AND FLAME-RETARDING FIBERS

(75) Inventor: Jim J. Sheu, Dunwoody, GA (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/392,166

(22) Filed: Sep. 8, 1999

(51) Int. Cl.[7] .................................................. G02B 6/44
(52) U.S. Cl. ........................ 385/109; 385/100; 385/111
(58) Field of Search .................................. 385/100, 102, 385/104, 105, 106, 109, 111

(56) References Cited

U.S. PATENT DOCUMENTS

| | | | |
|---|---|---|---|
| 4,701,016 | 10/1987 | Gartside, III et al. | 385/100 |
| 4,867,526 | 9/1989 | Arroyo | 385/107 |
| 4,909,592 | 3/1990 | Arroyo et al. | 385/113 |
| 5,146,046 | 9/1992 | Arroyo et al. | 174/23 R |
| 5,249,248 | 9/1993 | Arroyo et al. | 385/113 |
| 5,373,100 | 12/1994 | Arroyo et al. | 174/23 R |
| 5,390,273 | 2/1995 | Rahman et al. | 385/112 |
| 5,630,003 | * 5/1997 | Arroyo | 385/113 |
| 6,173,100 | * 1/2001 | Newton et al. | 385/102 |

FOREIGN PATENT DOCUMENTS

| | | | | |
|---|---|---|---|---|
| 0 425 269-A2 | * | 2/1991 | (EP) | D01F/6/88 |
| WO-99/57201-A1 | * | 11/1999 | (WO) | C08L/101/00 |

* cited by examiner

*Primary Examiner*—Georgia Epps
*Assistant Examiner*—David N. Spector
(74) *Attorney, Agent, or Firm*—Thomas, Kayden, Horstemeyer & Risley, LLP (57) ABSTRACT

A preferred embodiment of the cable of the present invention incorporates a core, an outer jacket surrounding the core, and a commercially available super-absorbent fibers disposed between the core and the outer jacket as well as inside the core. The fibers may also be applied to a tape to be provided between the core and the outer jacket. The tape incorporates a first layer and super-absorbent fibers, with the super-absorbent fibers being applied to the first layer. Preferably, the first layer is formed of spun bonded non-woven polyester material, nylon spun bonded fabric, non-woven glass, polypropylene melt blown non-woven fabric, polyurethane spun bonded fabric, or TCF cellulose fabric, among others. Additionally, the fibers preferably are provided with a moisture content of greater than approximately 0 percent, by weight, thereby improving the flame-retarding characteristics of the tape.

29 Claims, 6 Drawing Sheets

CABLES WITH WATER-BLOCKING AND FLAME-RETARDING FIBERS

CROSS-REFERENCE TO RELATED APPLICATIONS

Reference is made to U.S. patent applications, Ser. No. 09/258,491, filed on Feb. 26,1999 and Ser. No. 09/258,533, filed on Feb. 26,1999 now U.S. Pat. No. 6,173,100.

BACKGROUND OF THE INVENTION

1. Field of the Invention

The present invention relates to cables and, in particular, to optical fiber cables incorporating fibers which impart water-blocking and flame-retarding characteristics to the cables.

2. Description of the Related Art

Many products, such as telecommunications and power cables, for instance, typically are provided with one or more forms of water-blocking protection, i.e. waterproof outer jackets, water-blocking powders and yarns, etc. Generally, such water-blocking protection is intended to reduce or eliminate the possibility of water entering the product so as to reduce the potential for water damage or for impairment of transmission. For example, once water enters a telecommunications cable, such as through a splice closure of the cable, freezing of the water can induce microbending in the optical fibers of the cable, which can result in fiber degradation or increased signal loss of the cable.

Heretofore, some prior art cables have incorporated water-blocking material in order to prevent water penetration into and migration through the cables. An example of such a prior art cable is described in U.S. Pat. No. 5,390,273, issued to Rahman, for instance. In the cable described therein, water-blocking material is disposed in any otherwise empty spaces within a fluid impervious tube surrounding a plurality of optical fibers and between the barrier layer and the tube. The water-blocking and/or hydrogen absorbing compound can be in the form of a known type of grease and can be thixotropic so that there can be movement of the optical fibers with respect to each other and to tubes in the cable. Known types of water blocking compounds include a silicone based thixotropic compound, a compound based on hydrocarbon oils or polymeric liquids, such as polybutylene, and petroleum greases. The use of such a filling materials causes housekeeping problems, though, because these compositions of matter are somewhat messy to apply and require a cleaning agent such as a solvent to remove the filling compound to facilitate subsequent splicing. Also, care must be taken so that these agents do not affect adversely coloring material or coating material on the optical fiber. What is sought after is a cable in which the core is not filled with a grease-like material, but rather includes other provisions for blocking water flow along the core.

Heretofore, some prior art cables have also incorporated water-blocking tape in order to prevent water penetration into and migration through the cables. Examples of such prior art cables are described in U.S. Pat. No. 4,867,526, issued to Arroyo, for instance. In the cables described therein, water-blocking tape is disposed between the transmission media and the outer jacket of the cable, thereby forming a water-blocking barrier around the transmission media, i.e. optical fibers. The water-blocking tape incorporates super-absorbent materials, e.g. super-absorbent polymers (SAPs), which can absorb up to about one thousand (1000) times their weight in distilled water. The SAPs are provided in a loading of approximately 3.8–6.22 g|ft$^2$. This process results in a tape that weighs approximately 10–80% more than the substrate of the tape. Upon contact with water, the SAPs of the water-blocking tape absorb the water and swell, thereby preventing migration of the water through the cable. Additionally, the swollen SAPs form a physical barrier which can prevent more water from entering the cable.

Other examples of prior art cables are described in U.S. Pat. No. 4,909,592, issued to Arroyo et al. These prior art cables incorporate a water blocking system within the core tube. The water blocking system comprises a tape or yarn or both or a plurality of tapes or yarns. The tapes or yarns are provided so as to intentionally cause the core to include voids, and do not completely fill the interstitial core area around the optical fibers disposed within the core tube. The interstitial voids allows the fibers to be substantially decoupled transversely from the sheath system of the cable. This allows substantial motion of the transmission medium in at least one transverse direction when the cable is stressed such as by bending of the cable. However, the creation of these voids may not effectively cushion and center the transmission medium within the core. Further, upon contact with water, the water blocking system may not swell enough so as to prevent water migration to the transmission medium.

Heretofore another prior art solution to attain the characteristics of both water-blocking and flame-returning has been to deposit the SAPs in the cable in powder form which has had some measure of success. However, there are problems with this method of water-blocking. First, the friction between the powder and the components of the cable causes high loss due to microbending. Second, because the powder is inserted into the cable via electrostatic deposition, the powder settles to the bottom of the cable over time. Third, the powder can be difficult to apply evenly and some of the powder is lost during assembly. Fourth, the powder cannot be used inside the core tube due to microbending loss. For the same reason, the water-blocking tapes described hereinabove exhibit a lot of the same problems as the powder form does, due to the use of long woven surfaces.

Therefore, there is a need for improved cables and fibers which address these and other shortcomings of the prior art.

BRIEF SUMMARY OF THE INVENTION

Certain objects, advantages and novel features of the invention will be set forth in the description that follows and will become apparent to those skilled in the art upon examination of the following or may be learned with the practice of the invention. The objects and advantages of the invention may be realized and attained by means of the instrumentalities and combinations particularly pointed out in the appended claims.

The present invention generally is directed to water-blocking fibers with flame-retarding characteristics that are incorporated in cables such as fiber optic cables or electrical cables. In a preferred embodiment, the core tube of the cable includes a one or more optical fibers that are surrounded by a plurality of loose thin filamentary strands of super-absorbent fibers, whose individual length exceeds one millimeter and which randomly intertwine with each other to provide an effective cushion for the optical fibers. These loose filamentary strands comprise super-absorbent fibers, which provide water-blocking and flame retarding properties. Additionally, the fibers are provided with a moisture content of greater than approximately zero (0) percent, by weight, thereby improving the flame-retarding characteristics of the tape. Alternatively, the fibers can be placed between two layers of tape or applied as a substrate to a single layer tape. Preferably, the layers are formed of spun bonded non-woven polyester material, nylon spun bonded fabric, non-woven glass, polypropylene melt blown nonwoven fabric, polyurethane spun bonded fabric, or TCF cellulose fabric, among others.

In accordance with another aspect of the present invention, an embodiment of the fiber-filled core incorporates a plurality of the loose fibers in a tightly-packed configuration both inside the core tube and between the core tube and the outer jacket so as to fill all interstitial spaces and fully utilize the cushioning and locating properties of the fibers.

In accordance with still another aspect of the present invention, cables, such as telecommunications and power cables, for instance, are provided with a plurality of loose thin filamentary strands of fibers that possess both water-blocking and flame-retarding characteristics. In a preferred embodiment, a cable of the present invention incorporates a core and an outer jacket surrounding the core, with the loose fiber strands filling tightly all interstitial spaces into the core. The fiber can include a moisture content of greater than approximately 0 percent, by weight.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
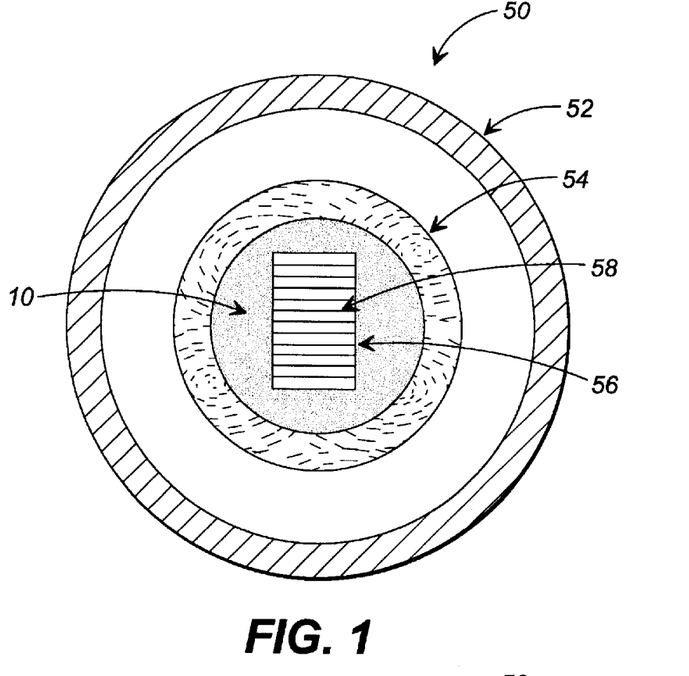
FIG. 1 is a cross-sectional end view of a representative cable incorporating the fibers of the present invention incorporated into the core tube.
Figure 2:
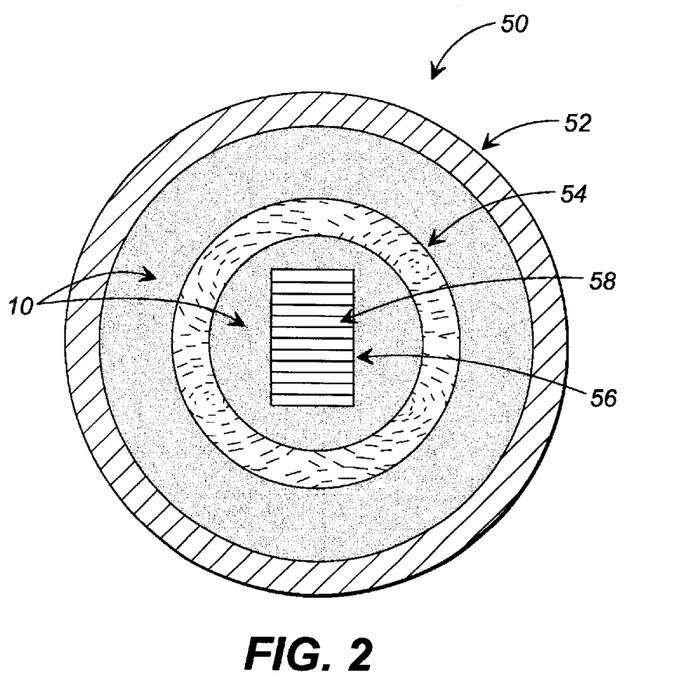
FIG. 2 is a cross-sectional end view of a representative cable incorporating the fibers of the present invention incorporated into the core tube and filling all interstitial spaces between core tube and outer jacket.

Reference will now be made in detail to the description of the present invention as illustrated in the drawings, wherein like reference numbers indicate like parts throughout the several views. In accordance with an aspect of the present invention, a water-blocking super-absorbent fiber is provided which also possesses heretofore unrecognized flame-retarding characteristics. As shown in FIG. 1, a preferred embodiment of the fibers 10 of the present invention incorporates fibers made from one of the following methods described below. A plurality of the loose fibers 10 intertwine with each other and exhibit the water-blocking and flame-retarding characteristics. As shown in FIG. 2, in a preferred embodiment the loose fibers are tightly packed into both the core tube and in the area between the core tube and the outer jacket so as to form a physical barrier to the flow of water, as well as to cushion and center the optical fibers within the core tube.

Figure 3:
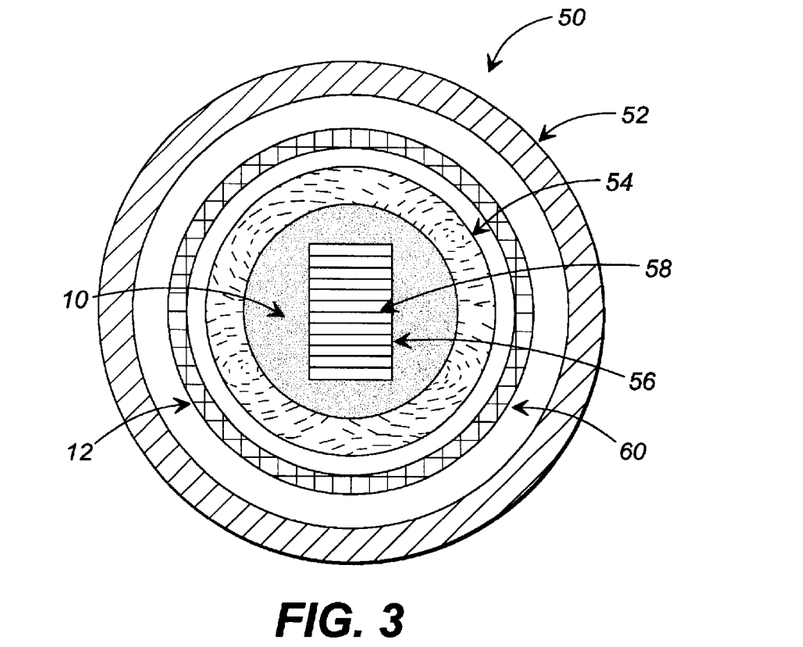
FIG. 3 is a cross-sectional end view of a representative cable incorporating the fibers of the present invention incorporated into the core tube, with a tape incorporating super-absorbent fiber disposed between the core tube and the outer jacket.

As shown in FIG. 3, in another embodiment the loose fibers are tightly packed in the core tube, while the tape incorporating the fibers is disposed between the core and the jacket. These materials (the fibers) are different from those that have gone on tapes heretofore. Additionally, the fibers may be incorporated both inside the core tube, and packed around the tape to fill all interstitial spaces.

There are at least three examples of super absorbent fibers that can be used in the cables. First is a fiber made from a partially hydrolyzed polyacrylonitrile fiber with about 30% ammonium polyacrylate on a 70% of the polyacrylonitrile residual backbone. This is available commercially from Toyobo Co. Limited in Japan and under the name Lanseal-F fiber. A second example is created by polymerization and cross-linking of sodium acrylate and hydroxyl containing compounds to form a filament, followed by extrusion to give a super-absorbent fiber. This is available commercially from Technical Absorbents Limited in the United Kingdom, under the name Oasis Fiber. Third, is a modification of an ARCO process involving polymerization of maleic anhydride and isobutylene. This is available commercially from Camelot Super Absorbents Inc. in Canada, under the name Camelot Fiber. The super-absorbent fibers can also be from any combination of the above processes.

As discussed hereinbefore, to provide the desired characteristic of water-blocking, a prior art solution has been to provide a water-blocking system inside the core in the form of a tape or yarn. The tapes and yarns can be awkward to use, difficult to manufacture and place in the correct position around the transmission medium, and do not lend themselves to being tightly packed within the core. The tapes and yarns must be disposed in the core in such a manner as to intentionally create voids that will allow motion of the transmission medium in at least one transverse direction when the cable is stressed, such as by bending of the cable. By creating the voids, the prior art leaves open the possibility of the water-blocking system not swelling sufficiently enough to prevent the migration of water to the transmission medium.

The instant invention addresses the problems of the cables of the prior art which incorporate the water-blocking tapes and yarns. The super-absorbent fibers are relatively easy to manufacture and place in the core tube. Because the fibers are loose, and not disposed upon a woven surface, the fibers allow the transmission medium to move sufficiently when stressed, thereby controlling the risk of microbending of the transmission medium. Further, the loose fibers can be tightly packed in the core so as fill all interstitial spaces, thereby reducing the possibility that water can migrate to the transmission medium.

As described hereinbefore, a prior art solution to achieve the desired characteristics of water-blocking and flame-retarding in tapes has been to add prior art flame-retardants, such as magnesium hydroxide or zinc borates, among others, which are salts or ionic compounds, to the SAPs (super-absorbent polymers, usually sodium polyacrylates) of the tapes. However, when prior art flame-retardants are added to the SAPs of the tapes, the SAPs' ability to absorb water can be significantly reduced, thereby resulting in tapes with marginal water-blocking capability. For example, a gram of SAPs typically can absorb approximately 1000 ml of distilled water. However, a gram of the same SAPs typically can absorb up to approximately 50 ml of sea water, which commonly includes multiple ion species, i.e. monovalent and divalent ions of sodium, magnesium, etc. The mechanism by which SAPs absorb and retain water has been described in the copending U.S. patent applications, Ser. No. 09/258,491 and Ser. No. 09/258,533, both filed on Feb. 26,1999, the disclosures of which are incorporated herein by reference.

As discussed hereinbefore, a fiber possessing the combined characteristics of water-blocking and flame-retarding is desired in many applications. Heretofore, a prior art solution to provide the desired characteristics of water-blocking and flame-retarding has been to add flame-retardants to SAPs of a tape. Prior art non-halogen flame-retardants are preferred in many applications because they do not release acidic or toxic halogen containing acid/gas during burning. However, the addition of prior art flame-retardants oftentimes results in a SAP composition which has reduced water-blocking characteristics as compared to the SAP before the flame-retardants were added. Reasons for these have also been described in the prior two copending U.S. patent applications, Ser. No. 09/258,491 and Ser. No. 09/258,533, now U.S. Pat. No. 6,173,100, both filed on Feb. 26,1999. It has been discovered that super-absorbent fibers possess heretofore unknown flame-retarding characteristics. Moreover, in accordance with the present invention (as shown in detail hereinafter), super-absorbent fibers can be utilized as flame-retardants and/or flame-retarding additives, such as by adding super-absorbent fibers to the SAPs of prior art water-blocking tapes, or by increasing the moisture content of the super-absorbent fibers.

The mechanism or mechanisms by which the flame-retarding characteristics of materials are improved by practicing the present invention are not heretofore fully understood; however, the release of water molecules absorbed by and/or bonded to super-absorbent fibers the release of carbon dioxide molecules from the carboxylates of the super-absorbent fibers, as well as the release of nitrogen and consumption of oxygen are considered important. Typically, in order to stop a fire, it is necessary to stop the combustion reaction of the fire. Fires generally are controlled and extinguished by, among others, cooling of the burning substrate and separating and/or replacing an oxidizing agent (air or oxygen). For example, water is an effective fire extinguishing agent because it possesses higher specific and latent heats (heat of evaporation, etc.) than those of most other extinguishing agents. On the other hand, carbon dioxide extinguishes fire by blanketing and smothering, thereby preventing oxygen from reaching the fire and the substrate. Once blanketing is maintained long enough to cool the substrate below the self-ignition temperature of the substrate, the fire is extinguished.

As discussed hereinbefore, super-absorbent fibers generally are capable of absorbing and bonding with water molecules. During a burning process of super-absorbent fibers water molecules absorbed, bonded and/or converted typically are released, thereby helping to extinguish a flame. However, even when no excess water has been absorbed into the network of the super-absorbent fibers, as described in detail hereinafter, the super-absorbent fibers typically exhibit the aforementioned improvement in flame-retarding characteristics. Therefore, it is hypothesized that carbon dioxide molecules of the super-absorbent fibers also may be released during burning, such as from the carboxylates of polyacrylic acids and polyacrylates, thereby helping to extinguish the flame. Ammonium ions that are in the super-absorbent fibers can release nitrogen during burning. Nitrogen is known to have some flame-retardant action. At high temperatures, the nitrogen may also be further oxidized by oxygen, and thus consume more oxygen. As mentioned hereinbefore, both carbon dioxide and water help in extinguishing fire.

In order to demonstrate the aforementioned water-blocking and flame-retarding characteristics of the present invention, five series of tests (e.g test series I–V) were conducted. The first, second and third series of tests were utilized to determine the limiting oxygen indexes (LOIs) of super-absorbent fibers samples, the fourth series was utilized to determine the absorbency of distilled water and swell height of super-absorbent fibers samples, and the fifth series was utilized to determine the water penetration of the SAPs.

Test samples were prepared utilizing three commercially available super-absorbent fibers Oasis Type 101, Oasis Type 102 and Oasis Type 112, all manufactured by Technical Absorbents, Ltd.

Test Series I

The first series of tests (examples 1-1 through 1-4, described hereinafter) was conducted in accordance with standard ASTM procedures (designation: D 2863-95). These tests were used to measure the minimum oxygen concentrations required to support candle-like combustion of fibers incorporated into a tape.

Figure 5:
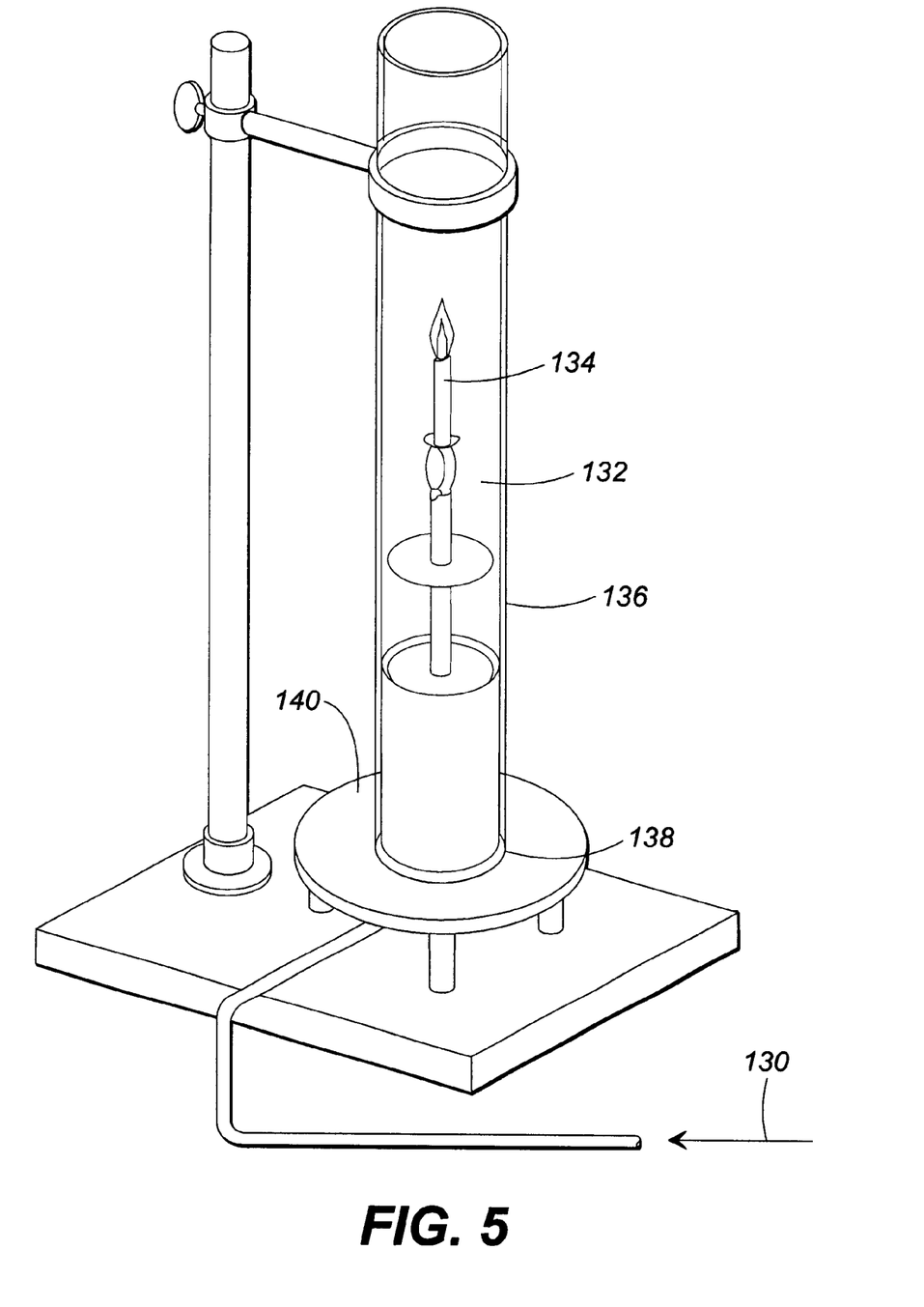
FIG. 5 is a perspective view of representative test equipment utilized in analyzing physical properties of super-absorbent fibers and tapes comprising super-absorbent fibers formed in accordance with the present invention.

In accordance with the aforementioned ASTM test procedures, the minimum concentration of oxygen, in a mixture 130 (FIG. 5) of oxygen and nitrogen flowing upward in a test column 132, that will just support combustion was measured under equilibrium conditions of candle-like burning. The equilibrium was established by the relation between heat generated from the combustion of a specimen 134 formed from a carboxylate-enriched composition, and heat lost to surroundings as measured by one of two arbitrary criteria, namely: (1) time of burning, or (2) length of composition burned. Test column 132 incorporated a heat resistant glass tube 136 which included a 75 mm minimum inside diameter and a 45 mm minimum height. The bottom 138 of the column was attached to a noncombustible base 140 which was adapted to mix and evenly distribute a gas mixture 130 entering column 132 through base 140. Each specimen 134 was placed within the column and a controlled flow of mixture 130 was allowed to enter the column. The specimen was then ignited with an ignition flame (not shown). The ignition flame was then removed and a timer started. Burning of each specimen was evaluated in accordance with standard ASTM procedures. The aforementioned procedures were then repeated with differing concentrations of oxygen until a critical concentration of oxygen was determined. Critical concentration of oxygen is defined as the lowest oxygen concentration that will yield standardized burn test results. Limiting Oxygen Index (LOI) then was calculated by the following equation:

$$LOI = (100 \times O_2)/(O_2 + N_2)$$

where. $O_2$ is the volumetric flow of oxygen ($mm^3/s$) corresponding to the critical concentration; and, $N_2$ is the volumetric flow of nitrogen ($mm^3/s$) corresponding to the critical concentration.

In order to demonstrate the effect of moisture content on the flame-retardance of fibers, the LOI was determined for several sets of samples, these samples included a range of moisture contents and loadings of fiber.

EXAMPLE 1-1

Specimens in this example were made by placing 3 $g/ft^2$ of Oasis Type 101, 6 mm long cut length fibers, manufactured by Technical Absorbents, Ltd., between two pieces of nonwoven base web, manufactured by Lantor, Inc., bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 8.4, 9.0, 14.5. The tapes were exposed to the following conditions, respectively; 100° C. chamber for 2 hours, 80% relative humidity and 23° C. for 3 hours, ambient conditions for 24 hours, 80% relative humidity and 23° C. for 0.5 hours. The method for determining moisture level will be described hereinafter. The tapes were subjected to testing as described hereinbefore. The LOI for each moisture content is shown hereinafter in Table 1.

TABLE 1

Limiting Oxygen Index (Oasis Type 101, 6 mm, 3 g/ft$^2$)

| Moisture Level (wt %) | LOI |
|---|---|
| 0 | 21.1 |
| 8.4 | 22.3 |
| 9.0 | 22.3 |
| 14.5 | 24.0 |

EXAMPLE 1-2

Specimens in this example were made by placing 6 g/ft of Oasis Type 101, 6 mm long cut length fibers between two pieces of nonwoven base web bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 11.0, 12.1, 17.6. The tapes were exposed to the following conditions, respectively: 100° C. chamber for 2 hours, 80% relative humidity and 23° C. for 3 % hours, ambient conditions for 24 hours, 80% relative humidity and 23° C. for 0.5 hours. The method for determining moisture level will be described hereinafter. The tapes were subjected to testing as described hereinbefore. The LOI for each moisture content is shown hereinafter in Table 2.

TABLE 2

Limiting Oxygen Index (Oasis Type 101, 6 mm, 6 g/ft$^2$)

| Moisture Level (wt %) | LOI |
|---|---|
| 0 | 21.4 |
| 11.0 | 23.8 |
| 12.1 | 24.7 |
| 17.6 | 26.9 |

EXAMPLE 1-3

Specimens in this example were made by placing 9 g/ft$^2$ of Oasis Type 101, 6 mm long cut length fibers between two pieces of nonwoven base web bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 14.0, 14.7, 19.8. The tapes were exposed to the following conditions, respectively: 100° C. chamber for 2 hours, ambient conditions for 24 hours, 80% relative humidity and 23° C. for 3 hours, 80% relative humidity and 23° C. for 0.5 hours. The method for determining moisture level will be described hereinafter. The tapes were subjected to testing as described hereinbefore. The LOI for each moisture content is shown hereinafter in Table 3.

TABLE 3

Limiting Oxygen Index (Oasis Type 101, 6 mm, 9 g/ft$^2$)

| Moisture Level (wt %) | LOI |
|---|---|
| 0 | 24.2 |
| 14.0 | 26.6 |
| 14.7 | 28.4 |
| 19.8 | 29.9 |

EXAMPLE 1-4

Specimens in this example were made by placing 12 g/ft$^2$ of Oasis Type 101, 6 mm long cut length fibers between two pieces of nonwoven base web bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 15.3, 16.6, 20.5. The tapes were exposed to the following conditions, respectively: 100° C. chamber for 2 hours, ambient conditions for 24 hours, 80% relative humidity and 23° C. for 3 hours, 80% relative humidity and 23° C. for 0.5 hours. The method for determining moisture level will be described hereinafter. The tapes were subjected to testing as described hereinbefore. The LOI for each moisture content is shown hereinafter in Table 4.

TABLE 4

Limiting Oxygen Index (Oasis Type 101, 6 mm, 12 g/ft$^2$)

| Moisture Level (wt %) | LOI |
|---|---|
| 0 | 25.8 |
| 15.3 | 28.4 |
| 16.6 | 29.4 |
| 20.5 | 30.0 |

Figure 6:
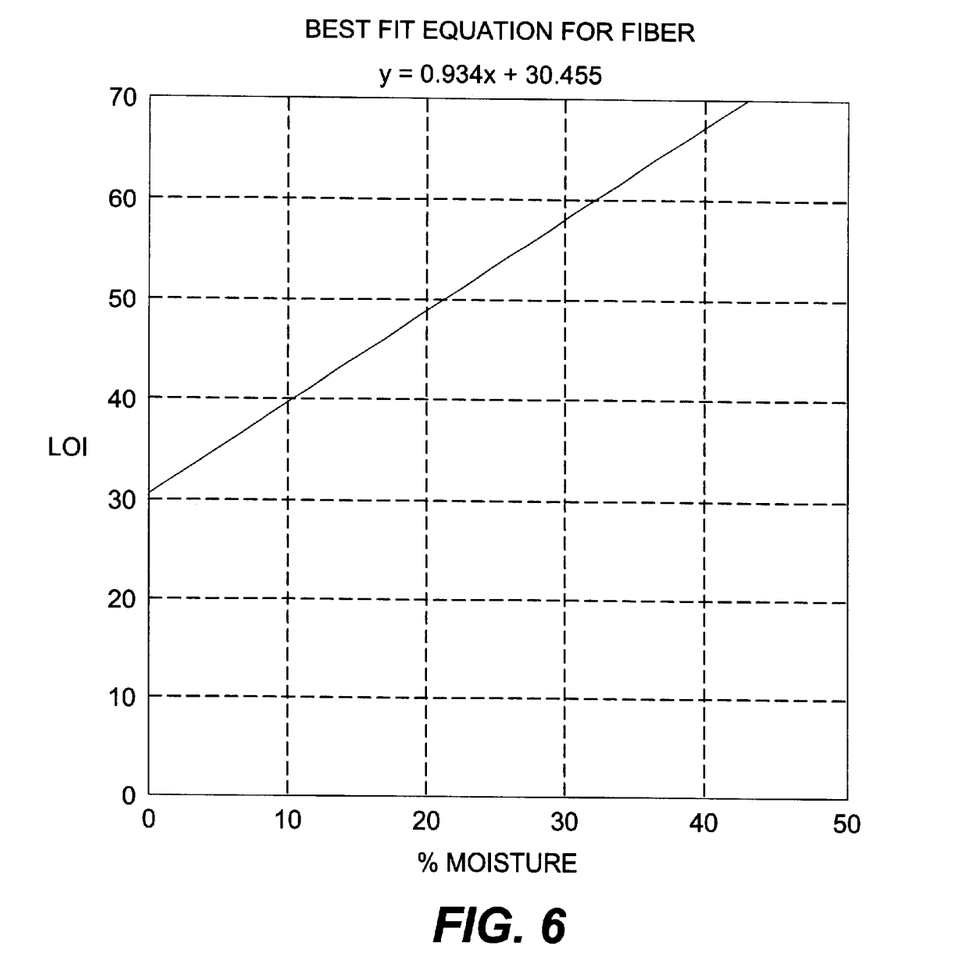
FIG. 6 is a graph illustrating Limiting Oxygen Index versus % Moisture for a representative super-absorbent fibers utilized in the present invention.

A summary of the information in Tables 1-4 can be found in FIG. 6. As shown in this figure, limiting oxygen indexes of the fibers contained between layers of the tape increases as the moisture content in these polymers increase. Therefore, the water molecules absorbed and bonded by these fibers enhance the flame-retardancy of the fibers.

Test Series II

The second series of tests (examples 2-1 through 2-5, described hereinafter) was conducted in accordance with standard ASTM procedures (designation: D 2863-95). These tests were used to measure the minimum oxygen concentrations required to support candle-like combustion of fibers incorporated into a tape along with a set amount of super-absorbent powder. in order to demonstrate the added advantage of super-absorbent fibers' flame retardancy.

EXAMPLE 2-1

Specimens in this example were made by placing 2 g/ft$^2$ of J550 powder, manufactured by Sumitomo Seika Chemicals, between two pieces of nonwoven base web bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 6.0, 15.6. The tapes were exposed to the following conditions, respectively: 100° C. chamber for 2 hours, ambient conditions for 24 hours, 80% relative humidity and 23° C. for 2 hours. The method for determining moisture level will be described hereinafter. The tapes were subjected to testing as described hereinbefore. The LOI for each moisture content is shown hereinafter in Table 5.

TABLE 5

Limiting Oxygen Index (J550, 2 g/ft$^2$)

| Moisture Level (wt %) | LOI |
|---|---|
| 0 | 21.7 |
| 6.0 | 21.6 |
| 15.6 | 24.7 |

EXAMPLE 2-2

Specimens in this series were made by placing 2 g/ft$^2$ J550 powder and 4 g/ft$^2$ of Oasis Type 102, 52 mm long cut length fibers between two pieces of nonwoven base web bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 6.8, 21.4. The tapes were exposed to the following conditions, respectively: 100° C. chamber for 2 hours, ambient conditions for 24 hours, 80% relative humidity and 23° C. for 2 hours. The method for determining moisture level will be described hereinafter. The tapes were subjected to testing as described hereinbefore. The LOI for each moisture content is shown hereinafter in Table 6.

TABLE 6

Limiting Oxygen Index (J550 Powder, 2 g/ft2, Oasis Type 102, 52 mm, 4 g/ft$^2$)

| Moisture Level (wt %) | LOI |
|---|---|
| 0 | 21.9 |
| 6.8 | 24.7 |
| 21.4 | 30.3 |

EXAMPLE 2-3

Specimens in this example were made by placing 2 g/ft$^2$ J550 powder and 8 g/ft$^2$ of Oasis Type 102, 52 mm long cut length fibers between two pieces of nonwoven base web, bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 10.6, 24.7. The tapes were exposed to the following conditions, respectively: 100° C. chamber for 2 hours, ambient conditions for 24 hours, 80% relative humidity and 23° C. for 2 hours. The method for determining moisture level will be described hereinafter. The tapes were subjected to testing as described hereinbefore. The LOI for each moisture content is shown hereinafter in Table 7.

TABLE 7

Limiting Oxygen Index (J550 Powder, 2g/ft$^2$, Oasis Type 102, 52 mm, 8 g/ft$^2$)

| Moisture Level (wt %) | LOI |
|---|---|
| 0 | 23.7 |
| 10.6 | 26.3 |
| 24.7 | 33.0 |

EXAMPLE 2-4

Specimens in this example were made by placing 2 g/ft$^2$ J550 Powder and 14 g/ft$^2$ of Oasis Type 102, 52 mm long cut length fibers between two pieces of nonwoven base web, bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 15.1, 27.2. The tapes were exposed to the following conditions, respectively: 100° C. chamber for 2 hours, ambient conditions for 24 hours, 80% relative humidity and 23° C. for 2 hours. The method for determining moisture level will be described hereinafter. The tapes were subjected to testing as described hereinbefore. The LOI for each moisture content is shown hereinafter in Table 8.

TABLE 8

Limiting Oxygen Index (J550 powder, 2 g/ft$^2$, Oasis Type 102, 52 mm, 14 g/ft$^2$)

| Moisture Level (wt %) | LOI |
|---|---|
| 0 | 23.6 |
| 15.1 | 29.5 |
| 27.2 | 37.9 |

EXAMPLE 2-5

Specimens in this example were made by placing 2 g/ft$^2$ J550 Powder and 16 g/ft$^2$ of Oasis Type 102, 52 mm long cut length fibers between two pieces of nonwoven base web, bound by an adhesive. Specimens were pressed flat with a Carver press and allowed to dry, forming a super-absorbent tape. Tapes were then exposed to different amounts of moisture resulting in tapes with the following moisture contents: (wt % moisture) 0, 15.8, 27.0. The tapes were exposed to the following conditions, respectively: 100° C. chamber for 2 hours, ambient conditions for 24 hours, 80% relative humidity and 23° C. for 2 hours. The method for determining moisture level will be described hereinafter. The tapes were subjected to testing as described hereinbefore. The LOI for each moisture content is shown hereinafter in Table 9.

TABLE 9

Limiting Oxygen Index (J550 powder, 2 g/ft$^2$, Oasis Type 102, 52 mm, 16 g/ft$^2$)

| Moisture Level (wt %) | LOI |
|---|---|
| 0 | 24.3 |
| 15.8 | 30.0 |
| 27.0 | 39.9 |

Figure 7:
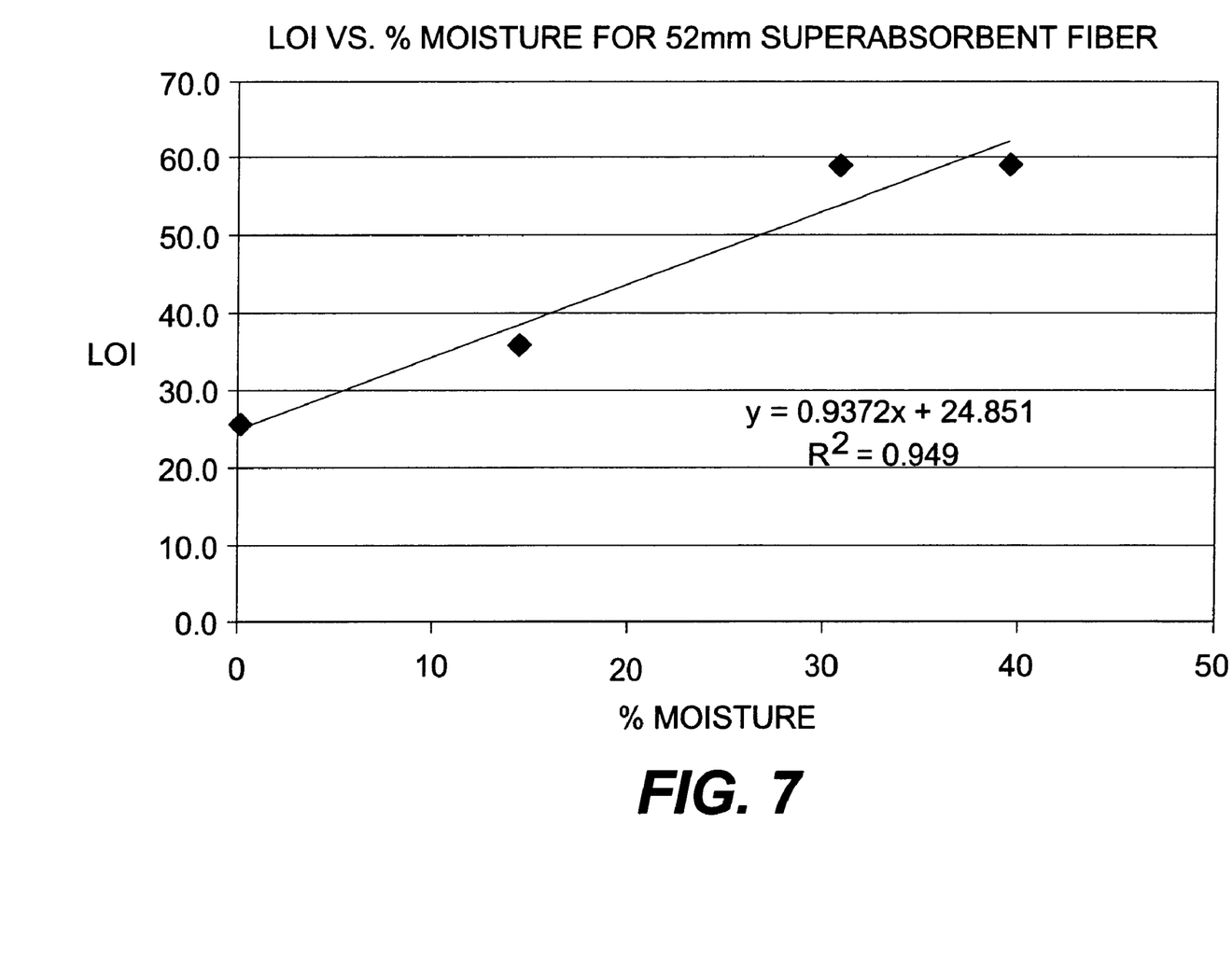
FIG. 7 is a perspective view of representative test equipment utilized in analyzing the absorbency of tapes comprising super-absorbent fibers formed in accordance with the present invention.

A summary of the information in Tables 5–9 can be found in FIG. 7. As shown in this figure, limiting oxygen indexes of the fibers contained between layers of the tape increases as the moisture content in these polymers increase. Therefore, the water molecules absorbed and bonded by these fibers enhance the flame-retardancy of the fibers.

Test Series III

The third series of tests (example 3-1, described hereinafter) was conducted in accordance with a modified version of standard ASTM procedures (designation: D 2863-95). These tests were used to measure the minimum oxygen concentrations required to support combustion of fibers in a dish. These samples were also exposed to various amounts of moisture to see the effect of moisture on the LOI of the fiber.

EXAMPLE 3-1

Specimens in this example were made by placing about 2 g of Oasis Type 102, 52 mm long cut length fibers in a ½" tall, 2" diameter aluminum dish. The fiber was distributed evenly and compactly in the dish. Samples were then exposed to different amounts of moisture resulting in samples with the following moisture contents: (wt % moisture) 0, 14.2, 30.7, 39.5. The samples were exposed to the following conditions, respectively: 100° C. chamber for 2 hours, ambient conditions for 24 hours, 75% relative humidity and 23° C. for 23 hours, 75% relative humidity and 23° C. for 3 hours. The method for determining moisture level will be described hereinafter. The tapes were subjected to testing as described hereinbefore. The LOI for each moisture content is shown hereinafter in Table 10.

TABLE 10

Limiting Oxygen Index (Oasis Type 102, 52 mm)

| Moisture Level (wt %) | LOI |
|---|---|
| 0 | 25.4 |
| 14.2 | 35.5 |
| 30.7 | 58.8 |
| 39.5 | 58.8 |

A summary of the information in Table 10 is shown in FIG. 3. As shown in this figure, limiting oxygen indexes of the fibers increases as the moisture content in these polymers increase. Therefore, the water molecules absorbed and bonded by these fibers enhance the flame-retardancy of the fibers.

Figure 4:
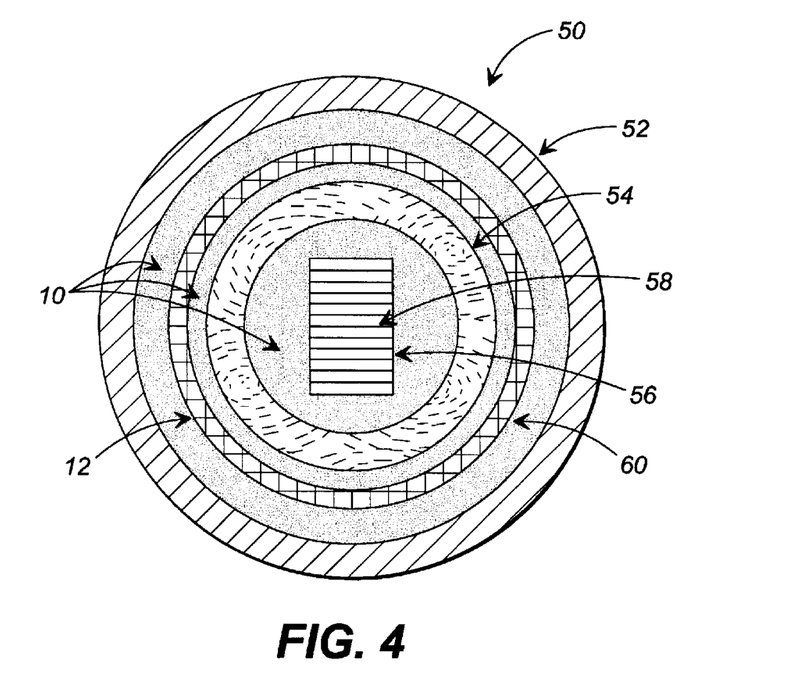
FIG. 4 is a cross-sectional end view of a representative cable incorporating the fibers of the present invention incorporated into the core tube, with the tape incorporating super-absorbent fiber disposed between the core tube and the outer jacket, and with super-absorbent fibers filling in all interstitial spaces around the tape between the core tube and the outer jacket.

It has been shown hereinbefote that increasing the moisture level in the fibers can increase the flame-retarding characteristics of the compositions (FIGS. 3,4). The amount of moisture suitable for use in "pre-loading" the fibers will, however, vary depending on the particular application.

The moisture level of a given fiber or fiber tape was determined first by weighing out three samples of about 2 grams each and recording their weight. The samples were then placed in a hot air oven for 2 hours at 100° C. Afterwards, the samples were immediately placed in a desiccator to cool for 15 minutes. Then the samples were weighed again and their weights were recorded. The moisture content of a given sample was calculated as follows:

$$M = (B-A)100/B$$

where: M is Moisture Content (wt %); B is weight of sample before drying; and, A is weight of the sample after drying.

Based on the actual test data, it can be seen that the addition of fibers to a water-blocking tape increases the LOI of the tape in proportion to the amount of fibers added to the tape. In addition, it can be seen that the addition of moisture to the fibers of a water-blocking tape increases the LOI of the tape in proportion to the amount of moisture added to the fibers in the tape.

Test Series IV

This series was conducted in order to determine the absorbency of tape specimens in distilled water.

EXAMPLE 4-1

In this example, specimens were tested in accordance with a standard free swell test in order to determine the absorbency of fiber and fiber tape specimens in distilled water. The specimens were formed from the following super-absorbent fibers, super-absorbent powder, and base web; Tape made with Oasis type 101, 6 mm (3, 6, and 9 g/ft$^2$); Tape made with J550F (2 g/ft$^2$) and Oasis type 102, 52 mm (4, 8, 14 and 16 g/ft$^2$); and Oasis Type 101 fiber, 6 mm cut length. Each specimen was weighed and the weight recorded. Each specimen was placed in a separate container. Approximately 800 ml of distilled water per gram of specimen was poured into the container, with the specimen and water being stirred as needed to ensure adequate mixing. After 30 minutes, the container contents were strained on a U.S. Standard Testing Sieve (NO. 35) for 10 minutes. Material remaining on the sieve after straining was weighed and the weight recorded. Absorbency for each sample was calculated by the following formula:

Absorbency=[(gel mass)−(initial sample mass)]/initial sample mass

Absorbency data for each sample is shown hereinafter in Table 11.

TABLE 11

Absorbency of Tape Specimens Incorporating Super-absorbent Fibers with Super-absorbent Powder and without Super-absorbent Powder and Fiber Specimens in Distilled Water

| Specimen | Avg. Absorbency | Absorbency ($\sigma$) | Absorbency ($\sigma$ %) |
|---|---|---|---|
| Tape Oasis type 101, 6 mm (3 g/ft$^2$) | 39.76 | 3.29 | 8.3 |
| Tape Oasis type 101, 6 mm (6 g/ft$^2$) | 55.3 | 2.78 | 5.0 |
| Tape Oasis type 101, 6 mm (9 g/ft$^2$) | 67.14 | 2.05 | 3.1 |
| Tape Oasis type 101, 6 mm (12 g/ft$^2$) | 70.17 | 2.6 | 3.7 |
| Tape J550F, Oasis type 102, 52 mm (2.0, 4 g/ft$^2$) | 103.3 | | 0.0 |
| Tape J550F, Oasis type 102, 52 mm (2.0, 8 g/ft$^2$) | 110.3 | | 0.0 |
| Tape J550F, Oasis type 102, 52 mm (2.0, 14 g/ft$^2$) | 91.7 | 21.1 | 23.0 |
| Tape J550F, Oasis type 102, 52 mm (2.0, 16 g/ft$^2$) | 108.9 | 29.3 | 26.9 |
| Oasis Type 101 fiber, 6 mm cut length | 124.6 | 1.0 | 0.8 |

EXAMPLE 4-2

Figure 8:
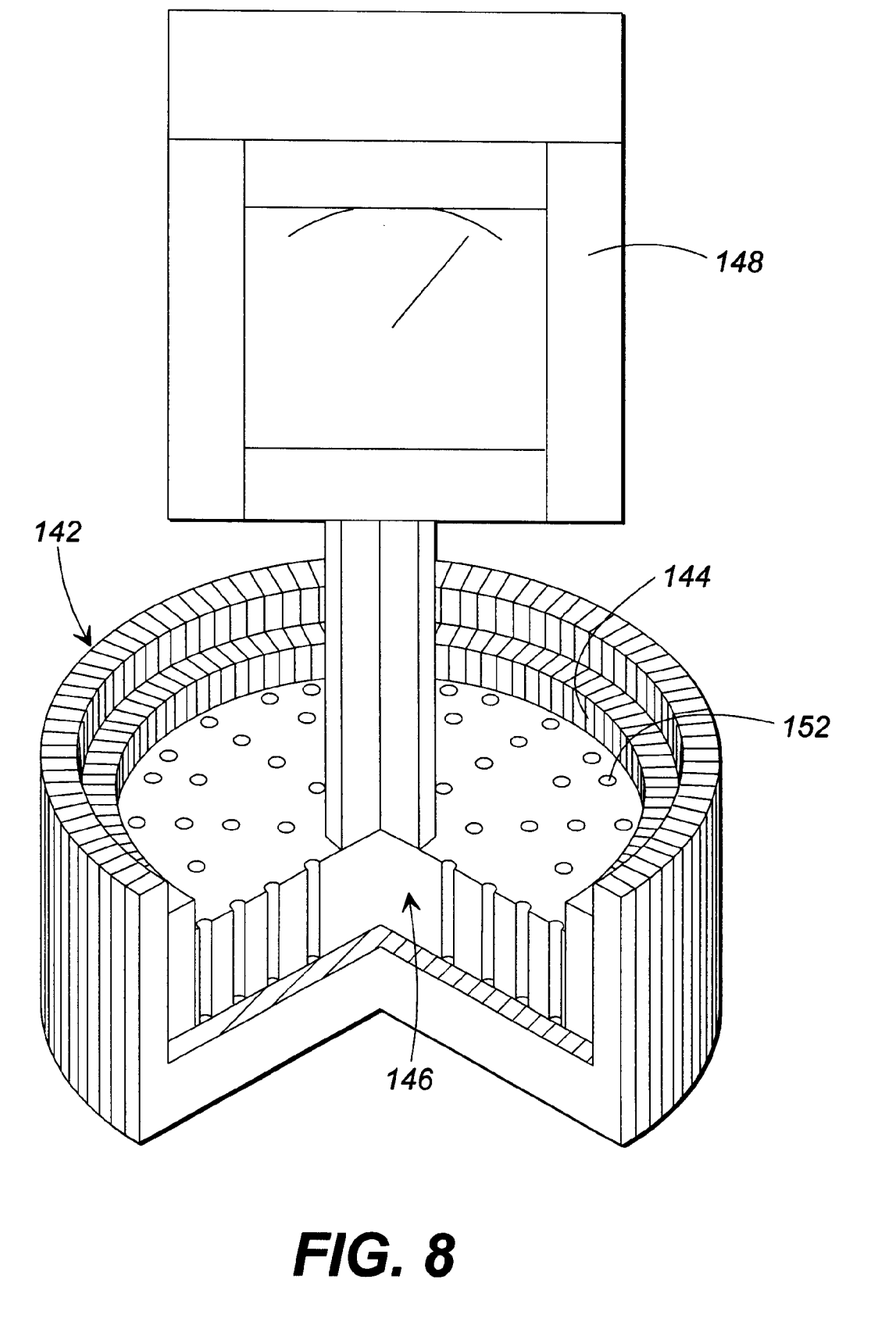
FIG. 8 is a graph illustrating the effects of prior art flame-retardants on the absorbency of a representative SAP.

In this example, testing was conducted in accordance with a cup and ram test in order to determine the swell height of tape specimens in distilled water. As shown in FIG. 8, the cup and ram test utilizes a cup 142. The cup includes an interior side wall 144 which cooperates with a ram 146 so that the ram can reciprocate vertically within the cup. The ram is attached to a meter 148 which measures the vertical displacement of the ram. In accordance with test procedures, the Oasis type 101 fibers, cut to 6 mm length, of average sample mass 0.20 g, were sized to coincide with the inside area of the cup and was placed into the cup and the ram was lowered into the cup on top of the fibers. Eighty grams of distilled water was poured into the cup so that the water could flow through holes 152 formed through the ram, thus allowing the water to contact the fibers. After a predetermined period of time, the vertical displacement of the ram was recorded. Average swell height data compared on an equal surface area basis for the fibers is shown hereinafter in Tables 12, 13, 14, respectively.

TABLE 12

Swell Height of Fiber Specimens in Distilled Water (1 minute)

| Sample | Avg. Swell Ht. (cm/g) | Swell Std. Dev. (σ) | Swell Std. Dev. (σ %) |
|---|---|---|---|
| Oasis type 101 fiber, 6 mm cut length | 2.4742 | 0.0238 | 1.0 |

EXAMPLE 4-3

In this example, testing was conducted in order to determine the swell height of tape specimens in distilled water. The tests were conducted in accordance with the procedures set forth in example 4-2, with the exception of the specimens being allowed to stand for two minutes prior to recording specimen swell height data. Average swell height data compared on an equal surface area basis for each tape is shown hereinafter in Table 13.

TABLE 13

Swell Height of Fiber Specimens in Distilled Water (2 minutes)

| Sample | Avg. Swell Ht. (cm/g) | Swell Std. Dev. (σ) | Swell Std. Dev. (σ %) |
|---|---|---|---|
| Oasis type 101 fiber, 6 mm cut length | 2.4607 | 0.0171 | 0.7 |

EXAMPLE 4-4

In this example, testing was conducted in order to determine the swell height of tape specimens in distilled water. The tests were conducted in accordance with the procedures set forth in examples 4-2 and 4-3, with the exception of the specimens being allowed to stand for ten minutes prior to recording specimen swell height data. Average swell height data compared on an equal surface area basis for each tape is shown hereinafter in Table 14.

TABLE 14

Swell Height of Fiber Specimens in Distilled Water (10 minutes)

| Sample | Avg. Swell Ht. (cm/g) | Swell Std. Dev. (σ) | Swell Std. Dev. (σ %) |
|---|---|---|---|
| Oasis type 101 fiber, 6 mm cut length | 2.3908 | 0.0207 | 0.9 |

Test Series V

The series was conducted to determine the amount of water penetration (migration) along a cable filled with the fibers. A 1 meter long 0.40" outer diameter, 0.33" inner diameter core tube containing 2, 12-fiber ribbons was filled with Oasis, 52 mm super-absorbent fiber. This cable specimen was attached to a water holding tank containing a 3'6" foot tall column of distilled water. The valve on the tank was opened to put a 3'6" pressure head on the cable specimen. After the designated length of time, the distance of the water traveled down the cable specimen was recorded. The results from the test are as follows:

EXAMPLE 5-1

In this example, specimens were tested using the Type 112 Fiber, containing 3.58 g/ft, with a loading of 12.4% moisture. The distance traveled is shown hereinafter in Table 15.

TABLE 15

Water Penetration Test, Oasis Type 112, 52 mm fiber (3.58 g/ft)

| Time (hours) | Distance Traveled (inches) |
|---|---|
| 1 | 4¼ |
| 24 | 6¼ |

EXAMPLE 5-2

In this example, specimen were tested using the Type 102 fiber, EXA8328001, with the cable containing of 14.2% moisture. The distance traveled is shown hereinafter in Table 16.

TABLE 16

Water Penetration Test, Oasis Type 102, 52 mm fiber (4.68 g/ft)

| Time (hours) | Distance Traveled (inches) |
|---|---|
| 1 | 3⅝ |
| 24 | 7¾ |

EXAMPLE 5-3

In this example, specimen were tested using the Type 112 Fiber with the cable containing 1,71 g/ft, and with a loading of 12.4% moisture. The distance traveled is shown hereinafter in Table 17.

TABLE 17

Water Penetration Test, Oasis Type 112, 52 mm fiber (1.71 g/ft)

| Time (hours) | Distance Traveled (inches) |
|---|---|
| 1 | 5 |
| 24 | 11 |

EXAMPLE 5-4

In this example, were tested using the Type 102 Fiber, EX A8328001, with the cable containing 1.160 g/ft, and with a loading of 14.2% moisture. The distance traveled is shown hereinafter in Table 18.

TABLE 18

Water Penetration Test, Oasis Type 102, 52 mm fiber (1.16 g/ft)

| Time (hours) | Distance Traveled(inches) |
|---|---|
| 1 | 4¾ |
| 24 | 9¾ |

From the above series of tests it can be said that super-absorbent fibers, such as but not limited to Oasis fiber, are effective at stopping or slowing the penetration of water in a core tube. Also, increasing the amount or density of fiber in the core tube does not substantially slow the penetration of water in a core tube.

Observations

Test data obtained during the aforementioned test series revealed the following: (1) the addition of super-absorbent fibers to a composition increases the LOI of the composition and, in this instance, increases the LOI in an amount directly proportional to the amount of super-absorbent fibers added; (2) the addition of super-absorbent fibers to a water-blocking tape increases the LOI of the tape in proportion to the amount of super-absorbent fibers added to the tape; (3) the addition of super-absorbent fibers to a water-blocking tape increases the absorbency of the tape in proportion to the amount of super-absorbent fibers added to the tape; (4) the LOIs of super-absorbent fibers increase as the moisture content in the super-absorbent fibers increase; and (5) super-absorbent fibers in the form of fiber effectively stop the penetration of water in a core tube.

Based on this data, it has been determined that fibers may be effectively utilized as flame-retardant additives for use with water-blocking tapes without producing a degradation in the total water-absorbing capacity of the tapes. In particular, the fiber 10 of the present invention effectively utilizes super-absorbent fibers as additives for imparting both flame-retarding and water-blocking characteristics to the fiber. This is accomplished without compromising the total water-absorbing capacity of the fiber, such as was common when practicing the prior art, e.g. adding prior art flame-retardants (salts) to the SAPs of water-blocking tapes.

For ease of description, and not for purposes of limitation, tapes 10 incorporating four grams and eight grams of super-absorbent fibers per square foot were utilized during the aforementioned test series. Additionally, moisture content varied between approximately 5 percent and approximately 40 percent, by weight. Both the amount of super-absorbent fibers utilized and the moisture content of the super-absorbent fibers utilized in a particular application may, however, vary depending upon the needs of the application. In particular, it has been determined that effective flame-retarding in tapes can be achieved by pre-loading the tapes with a moisture content of as low as approximately 2 percent. Furthermore, due to manufacturing and/or design consideration, it has heretofore been desirable to produce fibers 10 which have a limited thickness. Since the amount of polyacrylates in a super-absorbent fibers has an effect, to a degree, on fiber thickness, fibers 10 pressed into tape form that has a thickness of less than approximately 0.016 inches are preferred thus resulting in a preferable loading of less than approximately 12 g/ft$^2$.

In accordance with another aspect of the present invention, fibers 10 can be incorporated directly into structures such as cable 50 (FIG. 1), for instance. Cable 50 incorporates an outer jacket 52, formed of plastic, which surrounds a core tube 54. Core tube 54 includes transmission medium 56, such as optical fiber 58. Fibers 10 are also provided inside core tube 54 so as to fill all interstitial spaces in order to cushion and center optical fibers and further protect from flame and water. So configured, fibers 10 provides a water-blocking layer between the outer jacket and the transmission medium, thereby potentially preventing water from entering the core. Furthermore, as shown in FIG. 2, fibers 10 are provided so as to fill all interstitial spaces between outer jacket 52 and core tube 54. An additional embodiment (FIG. 3) can incorporate fibers 10 both inside the core tube 54 and incorporated into a tape 60, so that the tape is disposed between the outer jacket and the transmission medium. Another embodiment (FIG. 4) can incorporate fibers 10 inside the core tube 54; incorporated into the tape 60, so that the tape 60 is disposed between the outer jacket 52 and the transmission medium 58; and around the tape 60, filling the interstitial spaces between the core tube 54 and outer jacket 52.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. A cable comprising:

a core tube, said core tube having a transmission medium therein;

an outer jacket surrounding said core tube; and a plurality of loose non-woven, thin filamentary strands of super-absorbent flame-retardant fibers disposed within said core tube wherein said super-absorbent fibers range in length from 1 to approximately 50 millimeters.

2. The cable of claim 1, wherein said super-absorbent fibers are made by addition of partially hydrolyzed polyacrylonitrile fiber into a mixture of about 30 percent ammonium polyacrylate and 70 percent of polyacrylonitrile backbone.

3. The cable of claim 1, wherein said super-absorbent fibers made by polymerization and cross-linking by heating of sodium acrylate and hydroxyl containing compounds to form a filament, followed by extrusion.

4. The cable of claim 1, wherein said super-absorbent fibers are made by polymerization of maleic anhydride and isobutylene.

5. The cable of claim 1, wherein said super-absorbent fibers are a combination of super-absorbent fibers made by one or more of the following methods:

addition of partially hydrolyzed polyacrylonitrile fiber into a mixture of about 30 percent ammonium polyacrylate and 70 percent of polyacrylonitrile backbone;

polymerization and cross-linking by heating of sodium acrylate and hydroxyl containing compounds to form a filament, followed by extrusion; and polymerization of maleic anhydride and isobutylene.

6. The cable of claim 1, wherein said super-absorbent fibers have a moisture content of greater than approximately zero (0) percent, by weight, whereby said moisture content improves flame-retarding ability of said cable.

7. A cable comprising:

a core tube, said core tube having a transmission medium therein;

an outer jacket surrounding said core tube;

a plurality of loose non-woven, thin filamentary strands of super-absorbent flame-retardant fibers disposed within said core tube wherein said super-absorbent fibers range in length from 1 to approximately 50 millimeters; and a tape disposed between said core tube and said outer jacket, said tape having a first layer formed of at least one of the group consisting of: spun bonded non-woven polyester material, nylon spun bonded fabric, non-woven glass, polypropylene melt blown non-woven fabric, polyurethane spun polyurethane spun bonded fabric, and TCF cellulose fabric; and said super-absorbent fibers applied to said first layer.

8. The cable of claim 7, wherein said super-absorbent fibers have said moisture content of greater than approximately zero (0) percent, by weight, whereby said moisture content improves flame-retarding of such cable.

9. The cable of claim 7, wherein said super-absorbent fibers are made by addition of partially hydrolyzed polyacrylonitrile fiber into a mixture of about 30 percent ammonium polyacrylate and 70 percent of polyacrylonitrile backbone.

10. The cable of claim 7, wherein said super-absorbent fibers are made by polymerization and cross-linking by beating of sodium acrylate and hydroxyl containing compounds to form a filament, followed by extrusion.

11. The cable of claim 7, wherein said super-absorbent fibers are made by polymerization of maleic anhydride and isobutylene.

12. The cable of claim 7, wherein said super-absorbent fibers are a combination of super-absorbent fibers made by one or more of said methods:

addition of partially hydrolyzed polyacrylonitrile fiber into a mixture of about 30 percent ammonium polyacrylate and 70 percent of polyacrylonitrile backbone;

polymerization and cross-linking by heating of sodium acrylate and hydroxyl containing compounds to form a filament, followed by extrusion; and polymerization of maleic anhydride and isobutylene.

13. The cable of claim 7, wherein said tape comprises said super-absorbent fibers at a loading of at 4.3 grams per square foot of tape.

14. The cable of claim 7, wherein said tape has a second layer and said super-absorbent fibers are at least partially disposed between said first and second layers.

15. A cable comprising:

a core tube, said core tube having a transmission medium therein;

an outer jacket surrounding said core tube;

a plurality of loose non-woven, thin filamentary strands of super-absorbent flame-retardant fibers disposed within said core tube, wherein said super-absorbent fibers range in length from 1 to approximately 50 millimeters;

a tape disposed between said core tube and said outer jacket, said tape having a first layer formed of at least one of the types of fibers chosen from: spun bonded non-woven polyester material, nylon spun bonded fabric, non-woven glass, polypropylene melt blown non-woven fabric, polyurethane spun polyurethane spun bonded fabric, and TCF cellulose fabric, wherein said super-absorbent fibers are applied to said first layer; and said super-absorbent fibers are disposed between said core tube and said tape.

16. The cable of claim 15, wherein said super-absorbent fibers have said moisture content of greater than approximately zero (0) percent, by weight, whereby said moisture content improves flame-retarding of such cable.

17. The cable of claim 15, wherein said super-absorbent fibers are made by addition of partially hydrolyzed polyacrylonitrile fiber into a mixture of about 30 percent ammonium polyacrylate and 70 percent of polyacrylonitile backbone.

18. The cable of claim 15, wherein said super-absorbent fibers are made by polymerization and cross-linking by heating of sodium acrylate and hydroxyl containing compounds to form a filament, followed by extrusion.

19. The cable of claim 15, wherein said super-absorbent fibers are made by polymerization of maleic anhydride and isobutylene.

20. The cable of claim 15, wherein said super-absorbent fibers are a combination of super-absorbent fibers made by one or more of said methods:

addition of partially hydrolyzed polyacrylonitrile fiber into a mixture of about 30 percent ammonium polyacrylate and 70 percent of polyacrylonitrile backbone;

polymerization and cross-linking by heating of sodium acrylate and hydroxyl containing compounds to form a filament, followed by extrusion; and polymerization of maleic anhydride and isobutylene.

21. The cable of claim 15, wherein said tape comprises said super-absorbent fibers at a loading of less than twelve grams per square foot of tape.

22. The cable of claim 15, wherein said tape has a second layer and said super-absorbent fibers are at least partially disposed between said first and second layers.

23. A cable comprising:

a core tube, said core tube having a transmission medium therein;

an outer jacket surrounding said core tube;

a plurality of loose non-woven, thin filamentary strands of super-absorbent flame-retardant fibers disposed within said core tube, wherein said super-absorbent fibers range in length from 1 to approximately 50 millimeters;

a tape disposed between said core tube and said outer jacket, said tape having a first layer formed of at least one chosen from: spun bonded non-woven polyester material, nylon spun bonded fabric, non-woven glass, polypropylene melt blown non-woven fabric, polyurethane spun polyurethane spun bonded fabric, and TCF cellulose fabric, wherein said super-absorbent fibers are applied to said first layer; and said super-absorbent fibers disposed between said core tube and said tape, and between said tape and said outer jacket.

24. The cable of claim 23, wherein said super-absorbent fibers have said moisture content of greater than approximately zero (0) percent, by weight, whereby said moisture content improves flame-retarding of such cable.

25. The cable of claim 23, wherein said super-absorbent fibers are made by polymerization and cross-linking by heating of sodium acrylate and hydroxyl containing compounds to form a filament, followed by extrusion.

26. The cable of claim 23, wherein said super-absorbent fibers are made by polymerization of maleic anhydride and isobutylene.

27. The cable of claim 23, wherein said super-absorbent fibers are a combination of super-absorbent fibers made by one or more of said methods:

addition of partially hydrolyzed polyacrylonitrile fiber into a mixture of about 30 percent ammonium polyacrylate and 70 percent of polyacrylonitrile backbone;

polymerization and cross-linking by heating of sodium acrylate and hydroxyl containing compounds to form a filament, followed by extrusion; and polymerization of maleic anhydride and isobutylene.

28. The cable of claim 23, wherein said tape comprises said super-absorbent fibers at a loading of less than twelve grams per square foot of tape.

29. The cable of claim 23, wherein said tape has a second layer and said super-absorbent fibers are at least partially disposed between said first and second layers.

* * * * *